United States Patent [19]
Anderson

[11] 3,772,528
[45] Nov. 13, 1973

[54] OPTICAL PARAMETRIC DEVICE

[75] Inventor: Dean B. Anderson, Whittier, Calif.

[73] Assignee: North American Rockwell Corporation, El Segundo, Calif.

[22] Filed: Jan. 26, 1972

[21] Appl. No.: 221,005

Related U.S. Application Data

[60] Division of Ser. No. 31,814, April 16, 1970, Pat. No. 3,600,613, which is a continuation of Ser. No. 605,443, Dec. 28, 1966, abandoned.

[52] U.S. Cl................ 307/88.3, 330/4.5, 330/4.9, 330/53, 330/56
[51] Int. Cl.............................................. H03f 3/10
[58] Field of Search.................... 307/88.3; 330/4.5, 330/4.6, 4.9

[56] References Cited
UNITED STATES PATENTS

| | | | |
|---|---|---|---|
| 3,297,875 | 1/1967 | Garwin et al. | 330/4.5 |
| 3,563,630 | 2/1971 | Anderson et al. | 333/95 S |
| 3,660,673 | 5/1972 | Anderson | 333/4.9 |
| 3,386,787 | 6/1968 | Kaplan | 350/96 |
| 3,364,432 | 1/1968 | Boyd | 330/4.6 |

*Primary Examiner*—John Kominski
*Assistant Examiner*—Darwin R. Hostetter
*Attorney*—L. Lee Humphries et al.

[57] ABSTRACT

An optical parametric device is described which may be used as an amplifier, oscillator, or frequency converter, and which is operable in the infrared or visible spectral regions. The device utilizes a dielectric optical waveguide or tuned cavity, which structure may comprise the depletion layer of a semiconductor junction, the dielectric material of which exhibits nonlinear susceptibility. An intense, appropriately oriented, optical pump induces a non-linear electric polarization in the material of the dielectric structure. Traveling wave or discrete circuit parametric interaction occurs within the structure between the pump and an input signal. Under appropriate conditions, oscillation, amplification, and/or frequency conversion may be obtained.

10 Claims, 16 Drawing Figures

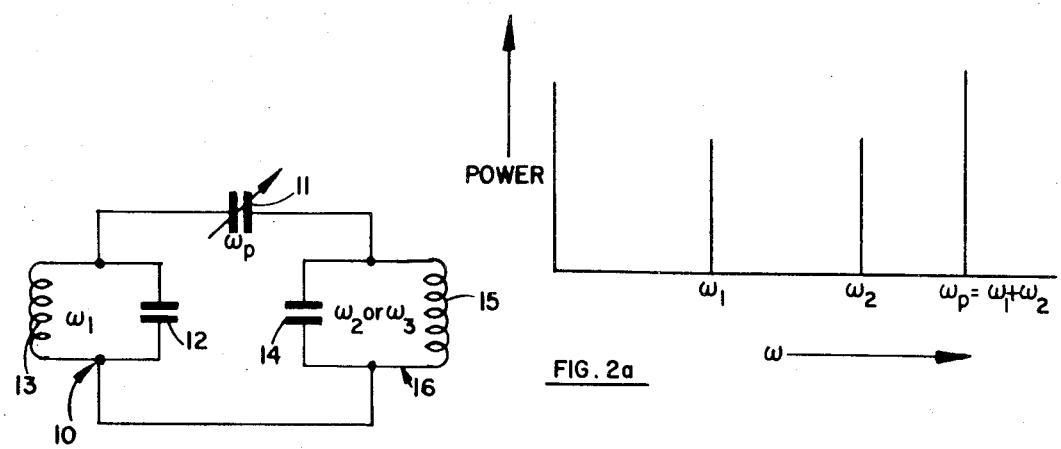
FIG. 1a
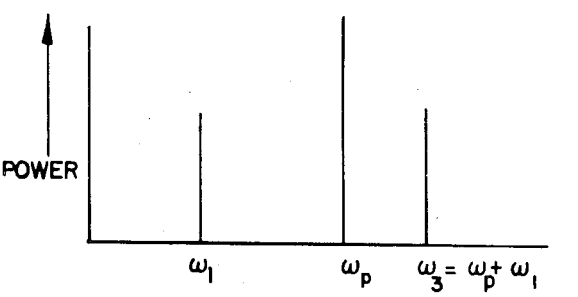
FIG. 2a
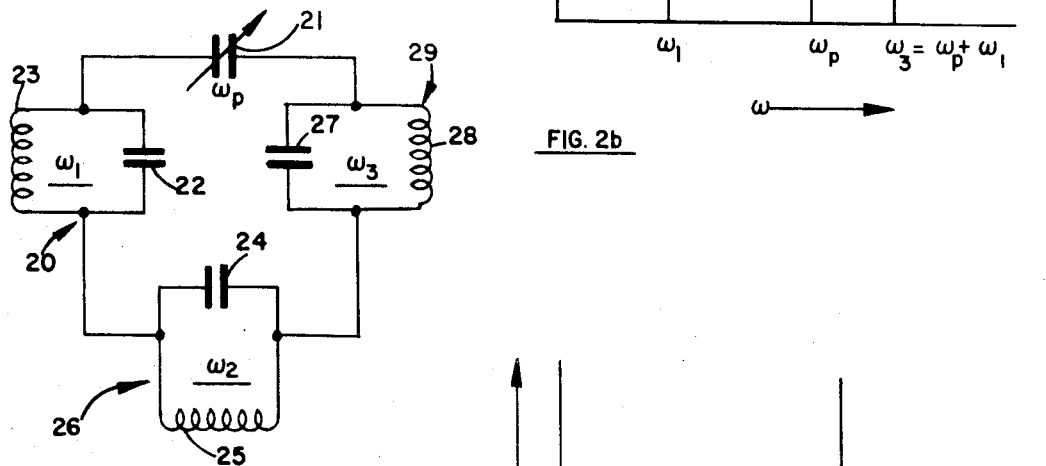
FIG. 1b
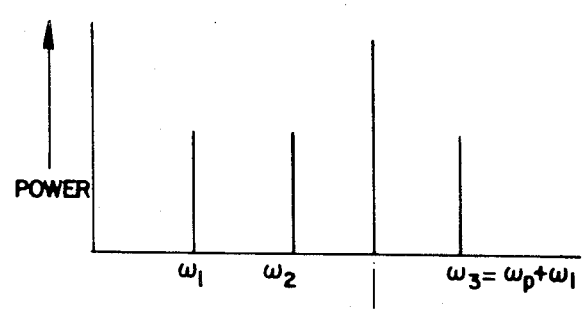
FIG. 2b
FIG. 2c

OPTICAL PARAMETRIC DEVICE

This is a division, of U.S. Pat. application Ser. No. 31,814 filed Apr. 16, 1970, now U.S. Pat. No. 3,600,613 which in turn was a continuation of U.S. Pat. application Ser. No. 605,443, filed Dec. 28, 1966, now abandoned.

BACKGROUND OF THE INVENTION

1. Field of the Invention

Low noise optical amplifiers and/or frequency converters are desirable to overcome the limitations associated with presently known optical detectors. For example, presently known thermal infrared detectors cannot simultaneously provide high sensitivity and fast response. While photon detectors can provide somewhat higher sensitivity and faster response than thermal detectors, their operation is limited to restricted spectral regions which depend either on the specific material used or on the nature of the detection phenomena employed.

While the use of laser amplifiers is a possibility, laser amplification inherently is limited to the natural frequencies associated with the materials used for the laser. In addition, laser amplifiers are somewhat noisy, since spontaneous, as well as stimulated, emission occurs at the frequency of operation.

An optical parametric device could provide essentially noiseless amplification and/or frequency conversion, and hence could be used in conjunction with infrared or optical detectors to provide systems having both high sensitivity and fast response throughout the infrared and visible spectral regions.

Parametric interaction depends on a reactive nonlinear phenomena. It involves the mixing in a reactive nonlinear element of a signal and an intense source called the pump, thereby producing sum and difference frequency combinations. These frequency combinations may be used for oscillation, frequency conversion, and harmonic generation, as well as for amplification. A parametric upconverter could be used to convert an input infrared signal to e.g., an output signal in the visual region which may be detected by a photon detector. Parametric interaction is essentially noise free because the spontaneous emission process is not involved.

2. Description of the Prior Art

To achieve efficient parametric interaction at optical wave lengths requires, e.g., that light at two or more related frequencies be propagated colinearly at the same phase velocity through a nonlinear medium. Previous successful approaches have employed birefringent materials to obtain these conditions. A birefringent crystal exhibits unequal indices of refraction for differently polarized light, the so called ordinary and extraordinary waves.

The phase velocity of light in a medium is given by $c/n$, where $c$ is the velocity of light in free space, and $n$ is the index of refraction of the material. Further, all materials are dispersive, i.e., their index of refraction is a function of wavelength. Thus, it is possible to select a birefringent material wherein light at two wavelengths may be propagated (as ordinary and extraordinary waves) with the same phase velocity and with the same direction.

With such a birefringent crystal, it is possible under specific conditions to obtain traveling wave parametric interaction between two unbounded plane waves. These conditions demand that light at the pump wavelength be transmitted along one preferred direction of the crystal (e.g., the extraordinary) at the same phase velocity at which the optical signal is transmitted down the second preferred direction (e.g., the ordinary) of the crystal. A further requirement of the birefringent material is that it exhibit nonlinear susceptibility. This allows the electric field of the pump to produce a nonlinear polarization within the crystal, and results in traveling wave parametric coupling between the signal and pump.

These prior art optical parametric devices all exhibited common limitations. Since they were dependent on birefringence, to control the frequency of operation required either selection of a different birefringent material, or altering of the birefringent characteristics as by varying the temperature, mechanical stress or electric field applied to the selected material. For such a birefringent parametric device, once the pump frequency was selected, the signal frequency was constrained to values related to the indices of refraction associated with the ordinary and extraordinary waves.

A further limitation was that birefringent parametric devices depended on interaction between unbounded plane waves, thus making it difficult to obtain the required pump power density necessary for significant parametric interaction. The prior art devices also exhibited a severely limited interaction length, either when the wavelengths required for parametric operation did not exactly correspond to those wavelengths which would be propagated with identical phase velocities in the birefringent crystal being used, or when the direction of the pump and signal did not coincide, as might happen when a lens were used to focus the pump.

The parametric devices of the prior art further were limited because birefringence permits ideal phase velocity matching for only two frequencies, thus permitting only second harmonic generation or degenerate parametric interaction. It was difficult to operate these devices in the three-frequency operational mode, and impossible to operate in the four-frequency mode. Such operation requires that the device be capable of propagating three or four related frequencies with the same phase velocity, or simultaneously being resonant at three or four related frequencies.

SUMMARY OF THE INVENTION

The parametric device which forms the subject matter of the present application provides amplification, oscillation or frequency conversion at optical frequencies without requiring use of a birefringent material to obtain matched phase velocities. In particular, the invention comprises a dielectric wavebinding structure such as a waveguide or tuned cavity, the dielectric material of which exhibits considerable nonlinear susceptibility. By appropriate control of the dimensions of the structure, conditions necessary for parametric coupling of optical signals over a wide range of wavelengths may be achieved.

In a preferred embodiment, the inventive optical parametric device comprises a $p$-$n$ junction depletion layer, dielectric tuned cavity which provides simultaneous resonances at a number of optical frequencies. Alternately, a dielectric waveguide type structure may be used as a traveling wave parametric device since such a waveguide simultaneously can propagate with a single phase velocity light at a number of frequencies, each in a different mode. The devices may be used in either the three- or four-frequency parametric operational mode and in either the degenerate, quasi-degenerate, or non-degenerate configuration.

It is thus an object of this invention to provide a device capable of parametric amplification, oscillation, or frequency conversion at frequencies in the visible or infrared spectral region.

Another object of this invention is to provide an optical parametric device capable of functioning in either the three- or four-frequency operational mode.

It is another object of this invention to provide a discrete circuit parametric device comprising a tunable, dielectric optical cavity simultaneously resonant at a number of optical frequencies.

It is yet another object of this invention to provide a traveling wave optical parametric device utilizing a dielectric optical waveguide wherein light at a number of wavelengths may be propagated simultaneously at the same phase velocity.

It is a further object of this invention to provide a tunable optical parametric device.

It is yet another object of this invention to provide an optical parametric device utilizing a tunable cavity or waveguide structure comprising a $p$-$n$ junction depletion layer.

It is yet another object of this invention to provide a parametric frequency converter capable of converting an optical signal at one wavelength to that of another wavelength.

A further object of this invention is to provide an infrared parametric upconverter capable of converting an input signal in the infrared region to an output signal in the visual spectral region.

A further object of this invention is to provide a parametric device for operation at optical wavelengths wherein a bounded wave may be amplified.

Yet another object of this invention is to provide a tunable parametric oscillator which may provide a visual output at selectable optical or infrared wavelengths.

Further objects and features of the invention will become apparent from the following description and drawings which are utilized for illustrative purposes only.

BRIEF DESCRIPTION OF THE DRAWINGS

FIG. 1a is a schematic diagram of an equivalent circuit of a discrete circuit, parametric device of the three-frequency configuration.

FIG. 1b is a schematic diagram of an equivalent circuit of a discrete circuit, parametric device of the four-frequency configuration.

FIG. 2a is a graph showing the operational mode spectrum of a typical non-degenerate three-frequency parametric device.

FIG. 2b is a graph showing the operational mode spectrum of a three-frequency parametric device useful for frequency conversion.

FIG. 2c is a graph showing the operational mode spectrum of a typical four-frequency parametric device.

DESCRIPTION OF THE PREFERRED EMBODIMENTS

Figure 1:
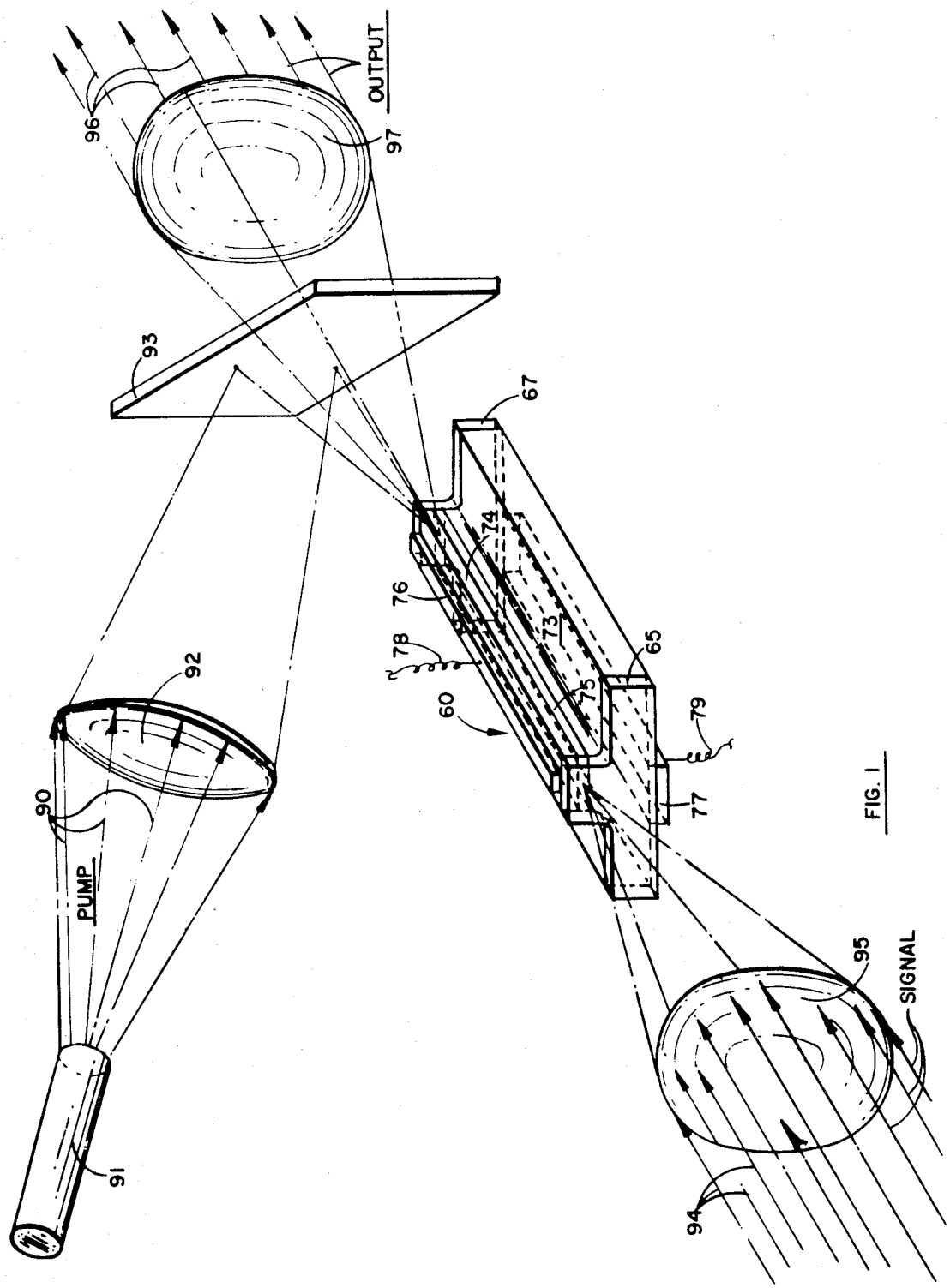
FIG. 1 shows a perspective view of a typical discrete circuit embodiment of the inventive optical parametric device.

Referring to FIG. 1 there is shown a typical discrete circuit embodiment of the inventive optical parametric device. As will be described in greater detail herein below, the device comprises an optical cavity 60 which may be resonant simultaneously at three or four frequencies which are appropriately related for parametric interaction. Within the cavity, parametric interaction occurs between a light signal 94 and an intense light pump 90, resulting in amplification and/or frequency conversion of the signal, and producing an output 96.

The discrete circuit embodiment illustrated in FIG. 1 may be operated in either the three- or four-frequency parametric operational mode. An equivalent circuit of the embodiment of FIG. 1 illustrating the three-frequency operational mode is shown schematically in FIG. 1a, while FIG. 1b shows an equivalent circuit for the four-frequency operational mode. As shown in FIG. 1a, a three-frequency parametric device comprises a first turned circuit 10 (including capacitance 12 and inductance 13) tuned to a first frequency $\omega_1$, and a second tuned circuit 16 (comprising capacitance 14 and inductance 15) tuned to a second frequency $\omega_2$ or $\omega_3$. The two tuned circuits 10 and 16 are coupled by a nonlinear or time varying capacitor 11, the capacitance of which is varied at a frequency $\omega_p$ called the pump frequency. (As used throughout this application, the term frequency means angular frequency $\omega$, where $\omega = 2\pi f$, and $f$ is the frequency of interest).

Parametric interaction between the pump energy (used to vary capacitor 11) at frequency $\omega_p$ and a signal may occur in the three-frequency device diagrammed in FIG. 1a when the parametrically related frequencies $\omega_1$, $\omega_2$, and $\omega_p$ bear the relationship:

$$\omega_p = \omega_1 + \omega_2 \tag{1}$$

The operational mode spectrum from such operation is shown as a graph of power versus frequency in FIG. 2a.

The equations relating the power $P_n$ present in tuned circuits 10 ($P_{\omega_1}$) and 16 ($P_{\omega_2}$) and the pump power ($P_{\omega_p}$) provided to capacitor 11 first were derived by Manley and Rowe; these Manley-Rowe equations in effect express the conservation of energy in a parametric device. For the three-frequency device whose operational mode spectrum is shown in FIG. 2a, the applicable Manley-Rowe equations are:

$$P_{\omega_p}/\omega_p + P_{\omega_1}/\omega_1 = 0 \quad (2a)$$

$$P_{\omega_1}/\omega_1 - P_{\omega_2}/\omega_2 = 0 \quad (2b)$$

where $\omega_p = \omega_1 + \omega_2$. A derivative of these equations and an excellent theoretical study of parametric device theory is contained in "Coupled Mode and Parametric Electronics" by William H. Louisell, published in 1960 by John Wiley & Sons, New York; Chapter 4 of that book is of particular interest.

A non-degenerate parametric device having the equivalent circuit of FIG. 1a and the operational mode spectrum shown in FIG. 2a is capable of operation as an oscillator or an amplifier. With no external signal applied to tuned circuits 10 and 16, and with sufficiently large pump energy applied to capacitor 11, oscillation growing in amplitude will occur at both frequencies $\omega_1$ and $\omega_2$. This energy may be removed from either tuned circuit 10 or 16 (depending on whether output is desired at $\omega_1$ or $\omega_2$, respectively) by providing the appropriate circuit with a suitable load. Such a parametric device may be characterized by having negative resistance and possibly infinite gain.

Alternately, the circuit shown in FIG. 1a may be used as a conditionally stable regenerative parametric amplifier provided that the pump power is reduced to a value below the oscillation threshold. If a weak signal is applied (say at frequency $\omega_1$) to the corresponding tuned circuit 10, the input signal will increase in amplitude. The signal may be extracted at the same frequency ($\omega_1$) by providing an appropriate load at tuned circuit 10, or at another frequency ($\omega_2$) by providing a load at tuned circuit 16. In either case, the energy present in the unloaded tuned circuit or port is called the idler.

Note in FIG. 2a that if $\omega_1 = \omega_2 = \omega_p/2$, degenerate parametric operation of the circuit shown in FIG. 1a results.

The three-frequency parametric device, the equivalent circuit of which is shown in FIG. 1a, also may be operated in the unconditionally stable mode illustrated graphically in FIG. 2b. For such operation, tuned circuit 16 is resonant at frequency $\omega_3$, where $\omega_1$, $\omega_p$, $\omega_3$ are parametrically related frequencies having the relationship:

$$\omega_3 = \omega_p + \omega_1 \quad (3)$$

The applicable Manley-Rowe equations follow:

$$P_{\omega_p}/\omega_p + P_{\omega_1}/\omega_1 = 0 \quad (4a)$$

$$P_{\omega_1}/\omega_1 + P_{\omega_3}/\omega_3 = 0 \quad (4b)$$

As noted, this configuration is unconditionally stable, i.e., it will not oscillate. Moreover, the maximum gain obtainable from such a device is given by the relationship $$\text{Gain}_{max} \leq \omega_o/\omega_s \quad (5)$$

where $\omega_o$ is the output frequency and $\omega_s$ is the signal frequency.

The operational mode whose spectrum is shown in FIG. 2b is useful for amplification, frequency up-conversion with amplification, or frequency down-conversion. The device also may be used in the degenerate mode ($\omega_1 = \omega_p$) for second harmonic generation; when so used, the output ($\omega_o = \omega_3$) will be at twice the pump frequency (i.e., $\omega_o = 2\omega_p$).

The discrete circuit optical parametric device illustrated in FIG. 1 also may be operated in a four-frequency mode, an equivalent circuit of which is shown in FIG. 1b. The equivalent circuit of FIG. 1b includes three tuned circuits; circuit 20 is resonant at $\omega_1$ and comprises capacitance 22 and inductance 23; circuit 26 is resonant at $\omega_2$ and comprises capacitance 24 and inductance 25; and circuit 29 is resonant at $\omega_3$ and comprises capacitance 27 and inductance 28. Associated with the three circuits 20, 26, and 29 is nonlinear capacitor 21 which is varied at pump frequency $107_p$. It should be noted that the four parametrically related frequencies of this device are related by the equation:

$$\omega_1 < \omega_2 = \omega_p - \omega_1 < \omega_p < \omega_3 = \omega_p + \omega_1 \quad (6)$$

as illustrated in the operational mode spectrum of FIG. 2c.

With a four-frequency parametric device such as that shown in equivalent circuit form in FIG. 1b, amplification and up-and-down frequency conversion may be achieved. The signal to be amplified and/or converted in frequency may be introduced at any one of tuned circuits 20, 26, or 29, at the corresponding one of frequencies $\omega_1$, $\omega_2$, $\omega_3$. Similarly, the output may be obtained at any one of the frequencies $\omega_1$, $\omega_2$, or $\omega_3$, by providing a load to the corresponding one of tuned circuits 20, 26, or 29. Those tuned circuits which are not used either for input or output function as idler ports.

The equivalent circuit analysis and performance equations for all possible configurations of three- and four-frequency parametric devices are summarized in the article entireled "A General Catalog of Gain, Bandwidth and Noise Temperature Expressions for Four-Frequency Parametric Devices" by D. B. Anderson and J. C. Aukland, published in the IEEE Transactions of the Professional Technical Group on Electron Devices, Volume ED-10, Number 1, January, 1963.

Some attributes of four-frequency parametric devices include: (1) conditionally stable gain which is greater than the frequency ratio $\omega_o/\omega_s$ without an appreciable compromise of low noise properties; (2) improved control of amplifier behavior provided by the additional port or tuned circuit, which circuit loads the nonlinear reactance (e.g., capacitor 21 of FIG. 1b) without effecting the loading of the input or output tuned circuit; (3) amplification of signals at input frequencies greater than the pump frequency is possible; (4) up-or-down frequency conversion with arbitrary unilateral gain is possible when pump harmonics are present.

While the optical parametric device illustrated in FIG. 1 is of the discrete circuit variety, this invention is not so limited, and traveling wave parametric interaction also is contemplated. Such a traveling wave embodiment of the invention optical parametric device is described herein below in conjunction with FIG. 10; an equivalent circuit of this device is shown schematically in FIG. 3.

Figure 3:
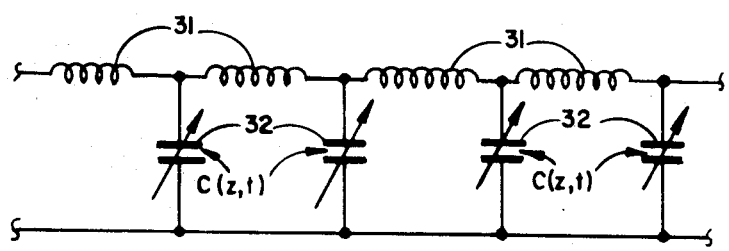
FIG. 3 is a schematic diagram of an equivalent circuit of a traveling wave parametric device.

FIG. 3 shows an equivalent circuit of a traveling wave parametric device comprising a series of inductances 31 and time-varying or nonlinear capacitances 32. In a preferred embodiment, capacitances 32 are made to vary with time $t$ (at frequency $\omega_p$) and distance $z$ along the transmission line (with a propagation constant $\beta_p$). Thus, the capacitance may be written in the form:

$$C(z,t) = C_o + |C_p| \cos(\omega_p t - \beta_p z)$$

(7)

where $C_o$ is the value of capacitance 32 absent a pump, and $|C_p|$ is the pump amplitude. The conditions under which parametric interaction may be achieved in either a three- or four-frequency operational mode are set forth in the article by P. K. Tien entitled "Parametric Amplification and Frequency Mixing in Propagating Circuits," published in the Journal of Applied Physics, Volume 29, No. 9, September, 1958, beginning at page 1,347.

The frequency relationships shown in the operational mode spectrums of FIGS. 2a, 2b, and 2c (and set forth in equations 1, 3, and 6) are applicable to the traveling wave parametric device illustrated in FIG. 3. However, the Tien conditions for traveling wave parametric interaction also require that the signal, pump, and idlers each be propagated along the transmission line with the same phase velocity. Alternately expressed, the propagation constants $\beta_1$, $\beta_2$, $\beta_p$, and $\beta_3$ associated respectively with waves at the frequencies $\omega_1$, $\omega_2$, $\omega_p$, and $\omega_3$, must bear the relationship:

$$\beta_1 < \beta_2 = \beta_p - \beta_1 < \beta_p < \beta_3 = \beta_p + \beta_1$$

(8)

Under these conditions, the traveling wave parametric device may be shown also to satisfy the Manley-Rowe conservation of energy equations mentioned above.

The traveling wave parametric device illustrated in equivalent circuit form by FIG. 3 is capable of operation as an oscillator, amplifier, and/or frequency-converter, under the appropriate load conditions set forth in the article by Tien referenced above.

Figure 4:
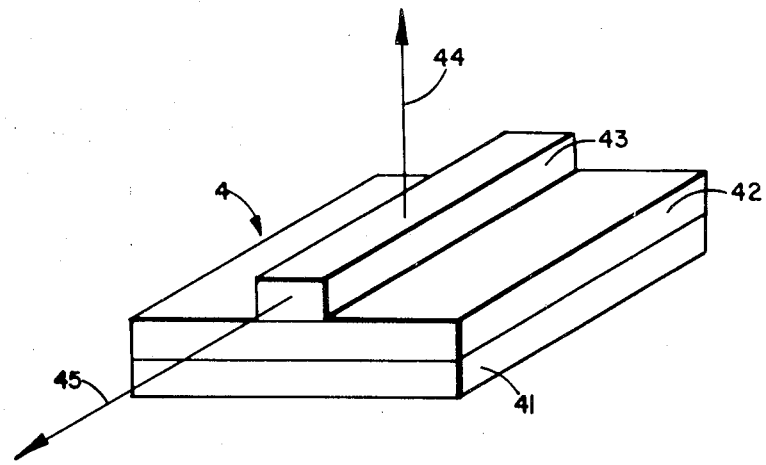
FIG. 4 shows a perspective view, in partial section and in partial elevation, of a typical dielectric optical waveguide.

The optical parametric devices which form the subject matter of this invention include tuned circuits or waveguides which utilize the wavebinding properties of dielectric materials. Illustrated in FIG. 4 is a typical embodiment of a dielectric waveguide 4 comprising a substrate 41 (which may comprise a dielectric, a semiconductor, or a metal), a first layer of dielectric material 42 and a dielectric ribbon 43. The dielectric material of ribbon 43 preferably should exhibit an index of refraction larger than that of layer 42. Ribbon 43, in a preferred embodiment, has a width of approximately one-half guide wavelength of the light to be guided, and a thickness which is no greater than its width. The characteristics of such a dielectric optical waveguide, as well as a description of how it may be constructed are described in U.S. Pat. No. 3,563,630 issued Feb. 16, 1971 and assigned to North American Aviation, Inc., assignee of this application.

A dielectric waveguide such as that shown in FIG. 4 is capable of propagating light simultaneously in a number of modes. Further, if light in a single mode is introduced into one end of waveguide 4 (e.g., in the hybrid electric mode) it will be propagated down the waveguide in this mode alone. Moreover, absent the specific conditions required for parametric interaction, should waves of two or more orders be present in the waveguide, they will be propagated independently, each only in its own mode, with no coupling therebetween.

Figure 5:
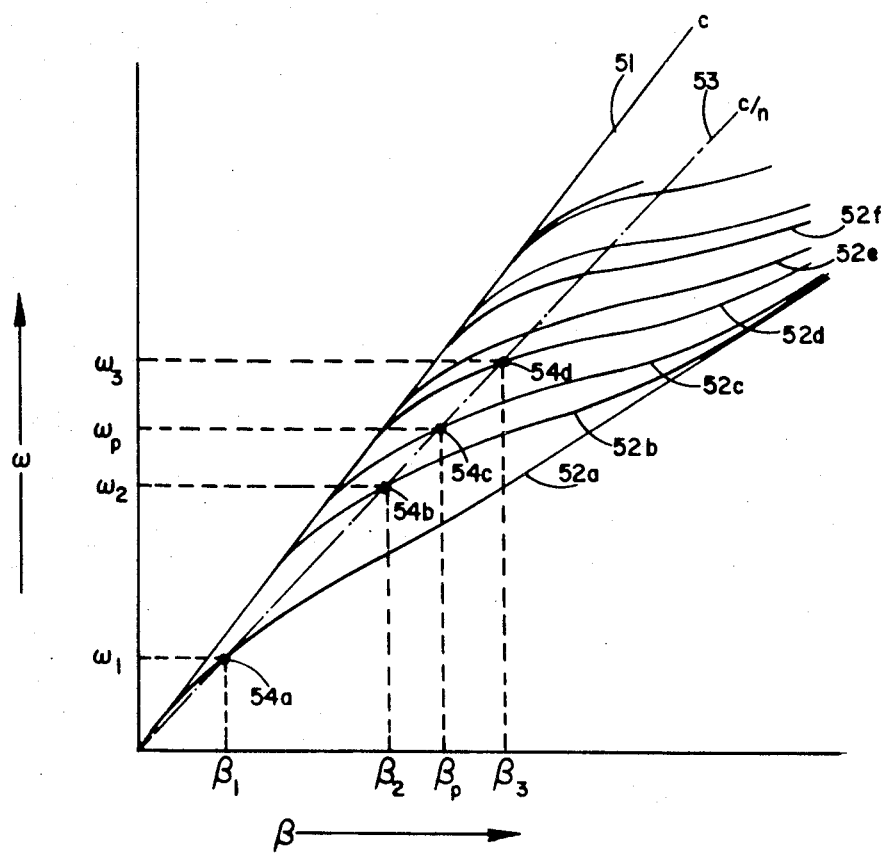
FIG. 5 shows a Brillouin ($\omega$-$\beta$) diagram for a typical dielectric waveguide; this diagram indicates the phase velocity and group velocity of light propagated through a dielectric waveguide as a function of angular frequency $\omega$.

FIG. 5 is a typical Brillouin ($\omega - \beta$) diagram showing the dispersion characteristics of a dielectric optical waveguide such as that shown in FIG. 4. Such an $\omega - \beta$ diagram shows the relationship between the group velocity and phase velocity of light propagated by a dielectric waveguide as a function of the wavelength of the light in the dielectric. This can be noted by recalling the phase velocity $\nu_p$ is given by the relationship:

$$\nu_p = \omega/\beta$$

(9)

while the group velocity $\nu_g$ is given by:

$$\nu_g = \delta\omega/\delta\beta$$

(10)

Thus in the $\omega-\beta$ diagram, the slope of a curve at a particular point indicates the group velocity at the corresponding frequency, while the phase velocity is given by the ratio $\omega/\beta$ at that point. A curve which lies along a radial such as line 51 (see FIG. 5) indicates that the corresponding waveguide is non-dispersive. Lines such as 52a, 52b, etc., which vary from a radial indicate that the corresponding dielectric waveguide is dispersive. A radial (e.g., line 53 in FIG. 5) also represents a line of constant phase velocity.

Figure 6A:
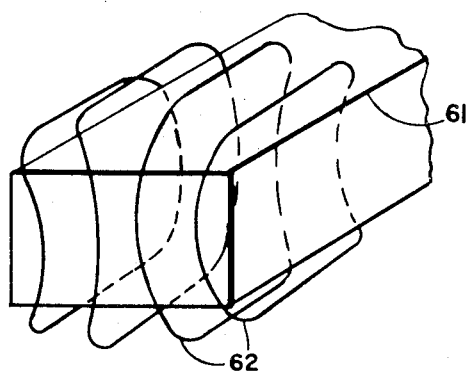
FIGS. 6a and 6b respectively illustrate vertical and horizontal polarization of light in the lowest order hybrid electric mode in a dielectric optical waveguide having rectangular cross-section.
Figure 6B:
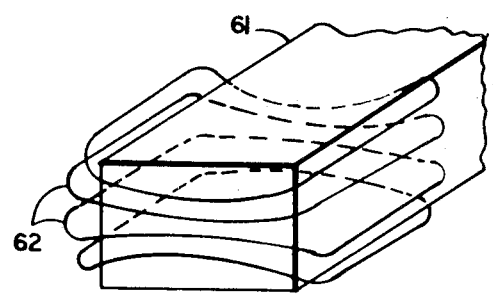
Figure 7A:
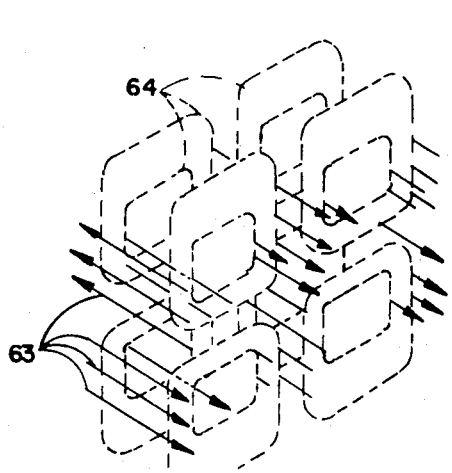
FIGS. 7a and 7b illustrate higher order transverse modes which may be propagated in a dielectric waveguide.
Figure 7B:
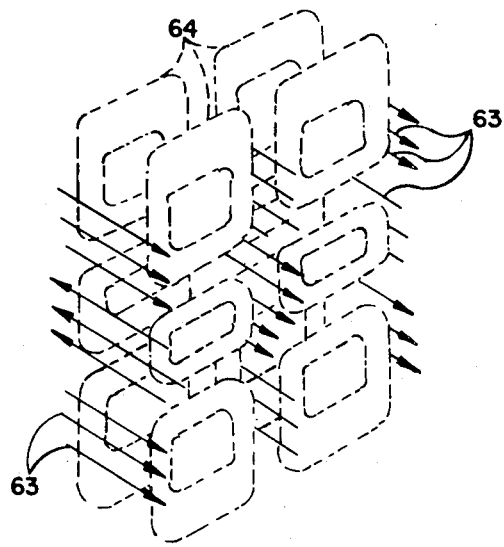

A dielectric waveguide such as that illustrated in FIG. 4 is capable of simultaneously propagating light in a number of modes. This is illustrated in the $\omega$-$\beta$ diagram of FIG. 5 by curves 52a, 52b, . . . , which represent respectively the dispersion of light traveling along a dielectric waveguide in various modes. These modes may be distinguished by their polarization orientation and by their transverse spatial distribution. Thus curve 52a may correspond to the lowest order hybrid electric mode with vertical electric field polarization; such a mode is illustrated by the diagram of FIG. 6a. FIG. 6b shows a lowest order hybrid electric mode with horizontal polarization; the $\omega$-$\beta$ curve corresponding to this mode and polarization is not shown in FIG. 5. Curves 52b and 52c (see FIG. 5) correspond to the next two higher order transverse modes, such as those illustrated in FIGS. 7a and 7b.

Radial line 53 intercepts lines 52a, 52b, . . . at corresponding points 54a, 54b, . . . (see FIG. 5). Since line 53 represents the loci of constant phase velocity, points 54a, 54b, etc., correspond to frequencies which simultaneously may be propagated (each in a different mode) along a dielectric optical waveguide with the same phase velocity.

The $\omega-\beta$ diagram of FIG. 5 indicates that points 54a, 54b, 54c, and 54d, lying on radial 53, correspond respectively to frequencies $\omega_1$, $\omega_2$, $\omega_p$, and $\omega_3$. Should these frequencies bear the relationship $$\omega_1 < \omega_2 = \omega_p - \omega_1 < \omega_p < \omega_3 = \omega_p + \omega_1,$$

it may be seen from FIG. 5 that the corresponding propagation constants $\beta_1$, $\beta_2$, $\beta_p$, and $\beta_3$ will be related by $$\beta_1 < \beta_2 = \beta_p - \beta_1 < \beta_p < \beta_3 = \beta_p + \beta_1.$$

This corresponds exactly to the conditions (6) and (8) requires for four-frequency parametric interaction in a distributed or traveling wave parametric device such as that described herein above in conjunction with the equivalent circuit of FIG. 3. Moreover, these relationships imply that the four waves are propagated along the dielectric waveguide with the same phase velocity, as indicated by the fact that the points 54a, 54b, 54c, and 54d each lie on the same radial line 53.

While a dielectric optical waveguide such as that illustrated in FIG. 4 will propagate light at frequencies and with propagation constants appropriate for traveling wave parametric interaction, such parametric operation further requires that the dielectric material of the waveguide exhibit nonlinear electric polarization susceptibility. Such nonlinear susceptibility occurs in all crystalline materials which have no center of inversion; it also occurs in crystals having a center of inversion when this inversion center is destroyed as by the application of an electric field or mechanical stress.

Table I lists a number of crystalline materials which exhibit nonlinear electric polarization susceptibility at optical wavelengths, together with an indication of the crystalline structure of the material.

TABLE I

| Material | Crystalline Structure | Nonlinear Susceptibility at a wavelength of 1.06 μ (in esu×10⁻⁹) |
|---|---|---|
| GaAs | Cubic (43m) | $X_{14} = 990 \pm 300$ |
| GaSb | Cubic (43m) | $X_{14} = 671 \pm 225$ |
| GaP | Cubic (43m) | $X_{14} = 260 \pm 35\%$ |
| InP | Cubic (43m) | $X_{14} = 1060 \pm 30\%$ |
| InAs | Cubic (43m) | $X_{14} = 630 \pm 225$ |
| InSb | Cubic (43m) | $X_{14} = 971 \pm 300$ |
| ZnS | Cubic (43m) | $X_{14} = 151 \pm$ |
| ZnSe | Cubic (43m) | $X_{14} = 195$ |
| ZnTe | Cubic (43m) | $X_{14} = 655$ |
| ZnO | Hexagonal (6 mm) | $X_{15} = 14.1$; $X_{31} = 12.9$; $X_{33} = 360$ |
| ZnS | Hexagonal (6mm) | $X_{33} = 83$ |
| CdSe | Hexagonal (6mm) | $X_{33} = 490$ |
| CdS | Hexagonal (6mm) | $X_{15} = 105$; $X_{31} = 96$; $X_{33} = 189$ |
| BaTiO₃ | Hexagonal (6mm) | $X_{15} = 105 \pm 3$; $X_{31} = 111 \pm 9$; $X_{33} = 42 \pm 3$ |
| AlPO₄ | Hexagonal (6m2) | $X_{11} = 2.52 \pm .2$ |
| BeO | Hexagonal (6mm) | |
| KH₂PO₄ (KDP) | Tetragonal (42m) | $X_{36} = 1.36 \pm 0$; $X_{14} = 3.04 \pm .15$ |
| KD₂PO₄ (KD*P) | Tetragonal (42m) | $X_{36} = 2.75 \pm .12$; $X_{14} = 2.73 \pm .09$ |
| NH₄H₂PO₄ (ADP) | Tetragonal (42m) | $X_{36} = 2.97 \pm .15$; $X_{14} = 2.94 \pm .15$ |
| KH₂AsO₄ (KDA) | Tetragonal (42m) | |
| LiNbO₃ | Trigonal (3m) | $X_{15} = X_{31}$; $X_{22} = 18.9 \pm 1.8$; $X_{31} = 35.75 \pm 5.1$; $X_{33} = 321 \pm 60$ |
| SiO₂ (α-quartz) | Trigonal (32) | $X_{11} = 2.46 \pm .12$; $X_{14} = 0.00 \pm .20$ |
| Te | Trigonal (32) | |
| Se | Trigonal (32) | |

As an example illustrating the nonlinear electric polarization susceptibility properties of the materials listed in Table I, consider gallium arsenide. GaAs is a cubic crystal with the zinc blend structure; this crystalline structure is classified as type 43M in the Hermann-Maugwin system. The nonlinear susceptibility tensor for gallium arsenide has the same symmetry properties as the piezoelectric tensor for the same crystalline structure class. The tensor has the form:

$$\begin{pmatrix} 0 & 0 & 0 & \chi_{14} & 0 & 0 \\ 0 & 0 & 0 & 0 & \chi_{14} & 0 \\ 0 & 0 & 0 & 0 & 0 & \chi_{14} \end{pmatrix} \quad (11)$$

where the equivalent components $\chi_{14} = \chi_{25} = \chi_{36}$ are shown. The induced nonlinear polarization components $P_x$, $P_y$, and $P_z$, respectively along the $x$, $y$, and $z$ cartesian coordinates (corresponding to the three [100] crystallographic directions in a cubic crystal) are given by:

$$P_x = \chi_{14} E_y E_z \quad (12a)$$
$$P_y = \chi_{14} E_z E_x \quad (12b)$$
$$P_z = \chi_{14} E_x E_y \quad (12c)$$

where $E_x$, $E_y$, and $E_z$ represent the cartesian components of the applied field.

Referring again to our example GaAs when an electric field is applied which is polarized in the (110) crystallographic plane, polarization components both parallel and perpendicular to the applied field will result within the crystal. The relative amplitude of these induced polarization fields as a function of the angle $\theta$ (which is measured in the (110) crystallographic plane from the [100] direction) is given by the graph of FIG. 8. As indicated by solid curves 68 in FIG. 8, when an electric field polarized in the [111] crystallographic direction is applied to GaAs the maximum induced polarization is polarized parallel to the incident field. As indicated by the dashed curves 66 in FIG. 8, when an electric field polarized in the [110] direction is applied to GaAs, the maximum induced polarization is polarized perpendicular to the incident field, (i.e., in the [001] crystallographic direction).

Optical parametric interaction in a dielectric waveguide such as waveguide 4 of FIG. 4 may be achieved by constructing ribbon 43 of a material having nonlinear susceptibility. For example, ribbon 43 may comprise GaAs oriented so that its [111] crystallographic direction corresponds to the direction indicated by arrow 44, and its [110] direction corresponds to that of arrow 45. Further, waveguide 4 preferably should have cross-sectional dimensions such that it exhibits dispersion characteristics which may be represented by the typical $\omega-\beta$ curves of FIG. 5.

Figure 8:
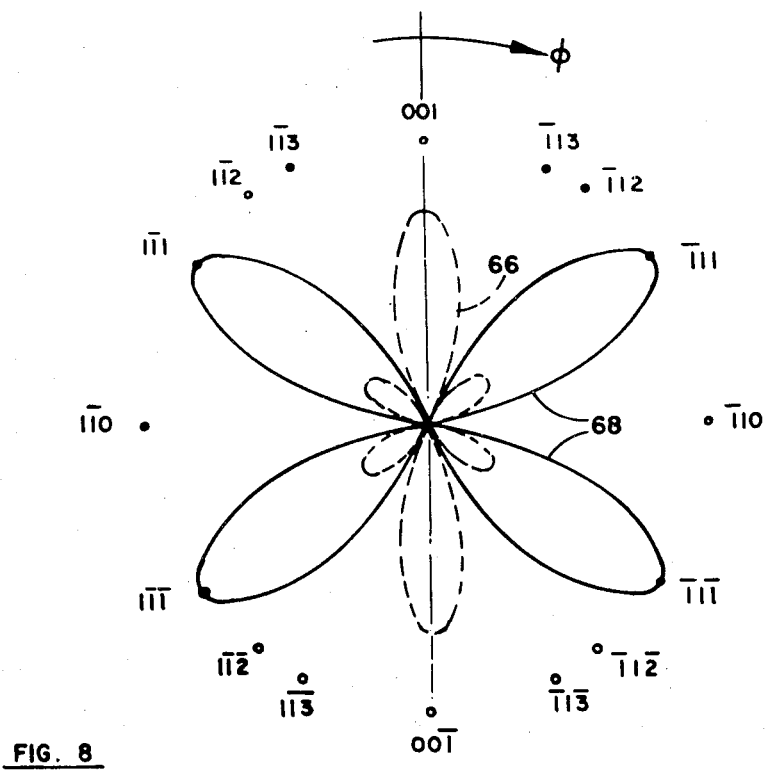
FIG. 8 shows a plot of the induced electric polarization intensity as a function of angle for a typical cubic crystal such as gallium arsenide which exhibits nonlinear susceptibility.

With such a waveguide, the nonlinear polarization induced by an intense light pump having its electric field component polarized in the (110) crystallographic plane would correspond to that indicated in the graph of FIG. 8. Such a pump of frequency $\omega_p$ may, e.g., introduce a hybrid electric mode of the third order, polarized in the [111] direction, into dielectric ribbon 43. This mode will be propagated down waveguide 4 at a phase velocity given by $\omega_p/\beta_p$ as shown, e.g., by point 54c in the $\omega-\beta$ diagram of FIG. 5.

Should a signal of frequency $\omega_1$ be introduced into the waveguide in the hybrid electric mode of the first order, it will be propagated along the waveguide with a propagation constant $\beta_1$ and with the same phase velocity (see point 54a in FIG. 5) as the pump. If the electric field component of the signal is oriented in the same plane as the maximum polarization induced in the dielectric by the pump, parametric coupling will occur between the pump and the signal. The signal amplitude will increase exponentially with distance along the waveguide and will emerge from the other end in amplified form. An idler wave also will be created in the waveguide having frequency $\omega_2 = \omega_p - \omega_1$; the idler will be propagated in the hybrid electric mode of the second order, with a propagation constant $\beta_2$ and a phase velocity (see point 54b of FIG. 5) identical to that of the pump.

The idler may be separated from the signal output by application of an appropriate optical filter placed at the end of the waveguide at which the signal and idler emerge. Amplification may be achieved by using a filter which will transmit light at the signal frequency and reject light at the idler frequency. Frequency conversion may be achieved by extracting the idler (at frequency $\omega_2$) rather than the signal at frequency $\omega_1$.

Using the device just described, both three- and four-frequency traveling wave parametric interaction may be achieved. By appropriate selection of the terminating filters the inventive parametric device may be made to function in any of the operational modes described in the Tien article referenced herein above.

While the foregoing discussion has been described with reference to a particular crystalline dielectric (namely GaAs), it is clear that any material having sufficient nonlinear susceptibility, such as those listed in Table I, may be used as the dielectric for the optical waveguide. When such other materials are used, of course, the maximum induced electric polarization will be along planes determined by the crystal line structure and may be along planes other than those indicated by the graph of FIG. 8. Moreover, a different set of $\omega-\beta$ curves analogous to those shown in the typical example of FIG. 5 must be used to determine the optical frequencies which will propagate with the same phase velocity. The form of these $\omega-\beta$ curves will depend on the indices of refraction of the waveguide material and the surrounding media, and the dimensions and shape of the waveguide. It should also be understood that while the example has been described in terms of a dielectric waveguide such as that shown in FIG. 4, the invention is not so limited, and dielectric waveguides having other configurations may be utilized.

While a dielectric optical waveguide configuration such as that illustrated in FIG. 4 may be used in a traveling wave parametric device, such a configuration has the disadvantage that it cannot easily be tuned. That is, once such a waveguide is constructed there is no way of altering the cross-sectional dimensions of the waveguide so as to change the set of frequencies which may be propagated therein at the same phase velocity. However, an alternate form of dielectric waveguide is available, the effective cross-sectional dimensions of which easily may be altered; a typical embodiment of such a tunable dielectric optical waveguide is illustrated in FIG. 9.

Figure 9:
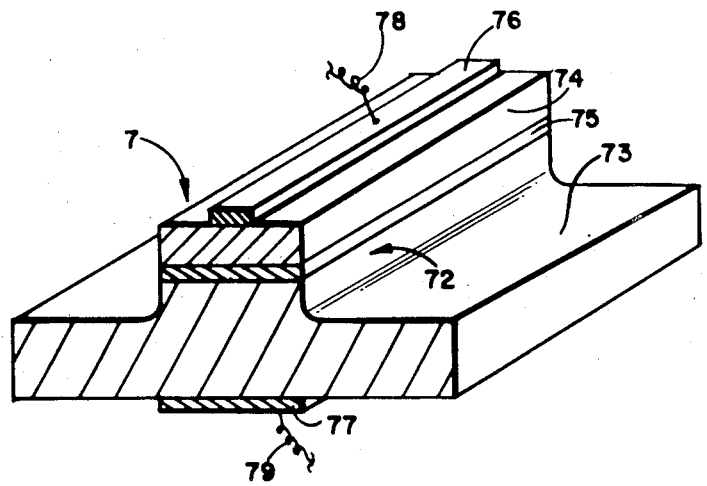
FIG. 9 shows a perspective view, in partial section and in partial elevation, of a $p$-$n$ junction depletion layer optical waveguide.

Referring now to FIG. 9, there is shown a p-n junction, depletion layer waveguide comprising a body 7 of semiconductor dielectric material having nonlinear susceptibility. A ribbon 72, which in a preferred embodiment has a width of approximately one-half guide wavelength of the light to be guided, extends from one surface of the body; the ribbon may be formed by photo-masking and etching techniques well known to those skilled in the art. Body 7 may be diffused so that the bottom portion 73 comprises an n-type semiconductor and upper portion 74 comprises a p-type semiconductor. (Alternately section 73 may be doped p-type and section 74 may be n-type). The diffusion may be accomplished in such a manner as to leave a horizontal p-n junction; when properly biased, this p-n junction comprises depletion layer 75.

Depletion layer 75 exhibits an index of refraction which is greater than the index of refraction of either n-type semiconductor region 73 or p-type semiconductor region 74. Thus, depletion layer 75 comprises a dielectric ribbon having an index of refraction different from its immediately surrounding regions, and hence may function as a dielectric optical waveguide.

If a bias voltage is applied across the p-n junction 7, as, e.g., by connecting a voltage between electrodes 76 and 77 (via electrical conductors 78 and 79), the thickness of depletion layer 75 will vary in response to the magnitude of the applied bias voltage. Alternating of this depletion layer cross-sectional dimension has the effect of varying the set of frequencies which may be propagated through the depletion layer waveguide at the same phase velocity. Alternately expressed, as the bias is varied, the shape of the $\omega-\beta$ curves describing the dispersion of the waveguide also will vary.

A depletion layer waveguide such as that illustrated in FIG. 9 may be constructed of any of the semiconductor materials, such as GaAs, which are listed in Table I. For use in an optical parametric device, the semiconductor material preferably should be oriented such that maximum nonlinear polarization may be achieved (in response to an appropriately polarized pump) in a plane corresponding to one in which a signal may be introduced. As described above in conjunction with FIG. 4, should GaAs be employed, it may be oriented so that its (111) crystallographic plane is parallel to depletion layer 75, and its (110) crystallographic plane is parallel to the ends of waveguide 7. This orientation offers the additional advantage that the (110) plane in GaAs is a cleavage plane, thus allowing waveguide 7 easily to be cut to any desired length.

Figure 10:
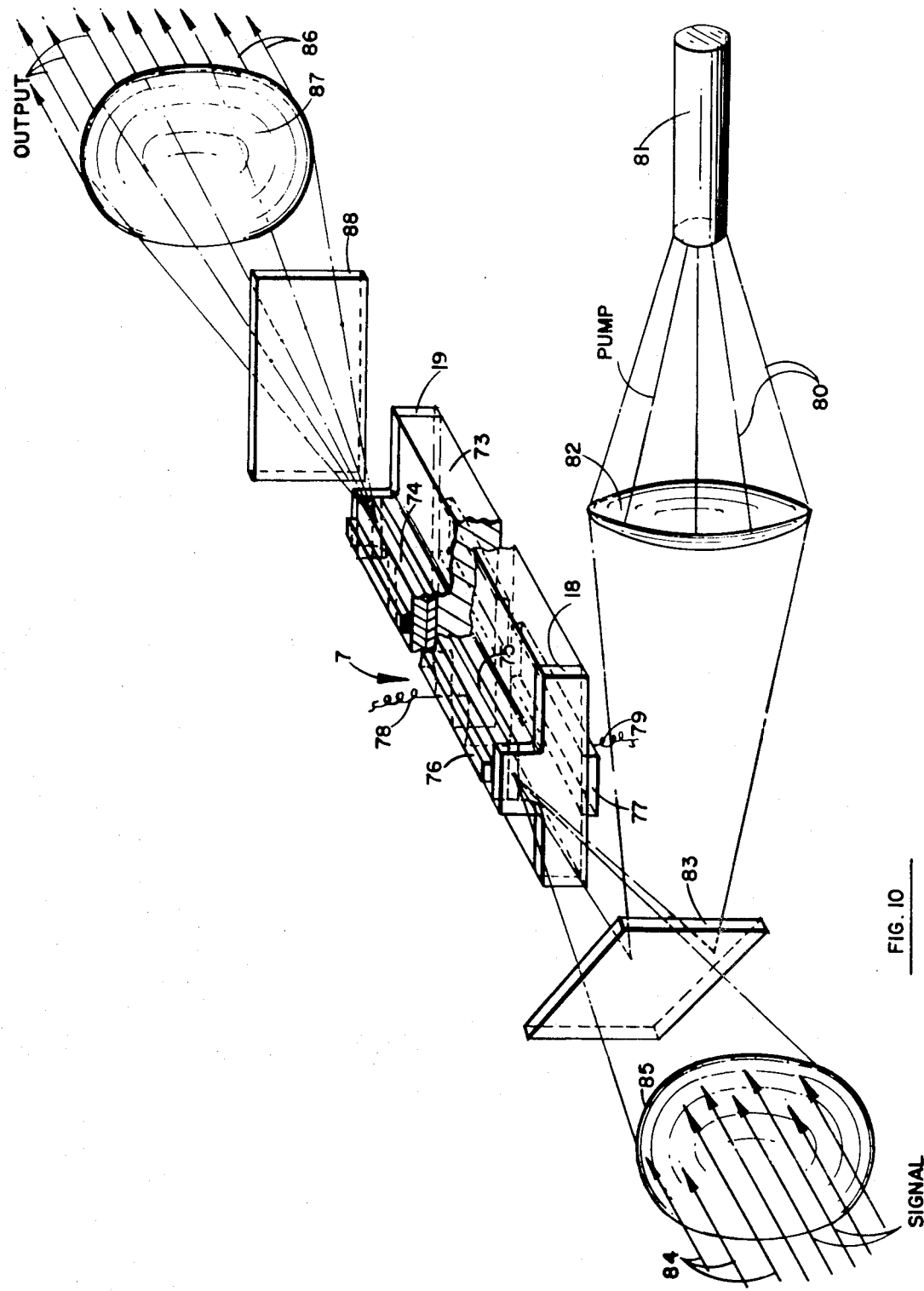
FIG. 10 shows a perspective view of a typical traveling wave embodiment of the inventive optical parametric device.

The depletion layer waveguide described herein above in conjunction with FIG. 9 may be employed as a traveling wave parametric device using, for example, the setup illustrated in FIG. 10. As shown in FIG. 10, depletion layer waveguide 7 may be of considerable length. Since the amplitude of a signal in a traveling wave parametric amplifier increases exponentially with distance in the active device, the longer waveguide 7 is made, the greater the gain which may be realized in the device.

To pump the parametric device, an intense light 80 of the lowest order and kind may be supplied by source 81 and may be focused on one end of waveguide 7 using lens 82 and dichroic mirror 83. (A dichroic mirror is one which reflects light at some wavelengths, e.g., $\omega_p$, and transmits light at other wavelengths, e.g., $\omega_1$.) In a preferred embodiment, light source 81 comprises a laser adjusted for single transverse mode operation; preferably source 81 also should produce light having a single longitudinal wavelength. It is desirable that pump 80 be polarized so that its electric field induces maximum electric polarization in the nonlinear susceptibility material comprising depletion layer waveguide 7.

As noted herein above in conjunction with FIG. 5, to achieve traveling wave parametric operation, the pump must be introduced into the waveguide in an appropriate mode (e.g., the transverse third order mode illustrated in FIG. 7b, and corresponding to $\omega-\beta$ curve 52c) so as to be propagated at the same phase velocity (see line 53 of FIG. 5) as the signal and idler. Mode conversion from the mode produced by laser source 81 to the desired mode may be achieved using optical mode converting dielectric films disposed on lens 82. (While such mode conversion could be achieved using a film on dichroic mirror 83 or on one end of the waveguide itself, this would not be as desirable since such films also would affect the mode of the input signal.)

Mode conversion by means of dielectric films is analogous to the operation of zone rings in a phase contrast microscope. For mode conversion, optically transparent dielectric materials such as those listed in Table II below may be disposed as thin films on portions of the surface of an optical component such as lens 82. The index of refraction of the material, the spatial pattern in which the film is disposed on the optical component, and the thickness of the film may be selected so as effectively to cause retardation of portions of the incident light. The recombination of the retarded and unretarded portions of light results in mode conversion.

TABLE II

| Material | Index of Refraction (between 1 micron and 2 microns) |
|---|---|
| $Al_2O_3$ | 1.8 |
| $CaF_2$ | 1.4 |
| $CeO_2$ | 2.2 |
| $LaF_3$ | 1.6 |
| $MgF_2$ | 1.4 |
| $MgO$ | 1.7 |
| $Si_3N_4$ | 2.1 |
| $SiO_2$ | 1.4 |
| $YF_3$ | 1.6 |
| $Y_2O_3$ | 1.8 |

The optical signal 84 to be amplified or frequency converted may be focused onto the same end of waveguide 7 as pump 80 via lens 85 and dichroic mirror 83. As discussed herein above, the signal and pump should bear frequency and mode relationships appropriate for traveling wave parametric interaction in the particular dielectric waveguide used. Further, the signal should have its electric field component polarized in the plane of maximum pump induced electric polarization.

Referring to the typical embodiment of the optical parametric device employing GaAs and having $\omega-\beta$ curves typified by those of FIG. 10, signal 84 may, e.g., be introduced into waveguide 7 in the lowest order hybrid mode (see FIG. 6a) at frequency $\omega_1$ (see FIG. 5). Alternately signal 84 may be introduced in the second order transverse mode (see FIG. 7a) at frequency $\omega_2$ (see FIG. 5) or in a higher order mode at frequency $\omega_3$ (see FIG. 5). Should the incident signal not have the correct mode, a thin film mode converter (such as that described in conjunction with pump 80) may be employed; such mode converter may be disposed on lens 85.

The polarization of signal 80 should correspond to the crystallographic plane in which maximum induced polarization occurs. Thus if waveguide 7 comprises GaAs with its (110) plane parallel to the ends of the waveguide, and its [111] direction perpendicular to the length of the waveguide, both the pump and the signal may be polarized in the [111] direction (i.e., in the vertical plane as illustrated in FIG. 10).

Parametric interaction in waveguide 7 between pump 80 and signal 84 will give rise to idler waves which will be propagated along the waveguide at the same phase velocity as the pump and signal. Thus, for example, in the four-frequency operational mode, interaction between a signal at frequency $\omega_1$ (see FIG. 5) in the lowest order hybrid mode and a pump (at frequency $\omega_p$) in the third order transverse mode will give rise to idlers at frequencies $\omega_2$ (in the second order transverse mode) and $\omega_3$ (in a higher order transverse mode). As indicated by the points 54a, 54b, 54c, and 54d in FIG. 5, each of these frequencies and modes lie on a line 53 of constant phase velocity.

The signal, idlers and pump will emerge from waveguide 7, and may be separated using an appropriate optical filter 88. Optical filter 88 may be of the thin film variety, well known to those skilled in the art, which filters exhibit little absorption in their passband, but are highly absorptive or highly reflective in their stopband. For example, the signal (in amplified form) at $\omega_1$ may be separated from the idlers (at $\omega_2$ and $\omega_3$) and the pump $\omega_p$ using a filter 88 which passes light at frequency $\omega_1$, but which is either absorptive or reflective at frequencies above $\omega_1$. A dichroic mirror may be employed as filter 88, in which case the mirror may be positioned at such an angle that reflected light (at frequencies $\omega_2$, $\omega_p$, and $\omega_3$) will not be directed back into waveguide 7. The output 86 (at frequency $\omega_1$) may be directed to a utilization device (not shown in FIG. 10 and not a part of this invention) by lens 87.

Frequency conversion may be achieved by using a filter 88 or a combination of filters which will pass one of the idlers and reject the other idler, pump and signal. For example; filter 88 may pass light at idler frequency $\omega_3$ but reject light at lower frequencies (including $\omega_1$, $\omega_2$, and $\omega_p$). It should be noted that with appropriate selection of filter 88 and dichroic mirror 83, signal 84 may be at any of the frequencies $\omega_1$, $\omega_2$, or $\omega_3$ (see FIG. 5), and similarly the output 86 may be at any of frequencies $\omega_1$, $\omega_2$, or $\omega_3$.

In a preferred embodiment, each end of waveguide 7 should be provided with an antireflective coating, as indicated in FIG. 10 by designations 18 and 19. Such antireflective coatings, which are well known to those skilled in the art, prevent light which has been propagated along waveguide 7 from being reflected back into the waveguide. Such reflected light may interfere with the desired traveling wave parametric interaction.

While not shown in FIG. 10, the bias applied across electrodes 76 and 77 of waveguide 7 (via conductors 78 and 79) may be varied in voltage so as to alter the thickness of depletion layer 75. As noted herein above, this accomplishes tuning of the optical waveguide so that it may propagate at a constant phase velocity, and hence permit parametric interaction at, selectable sets of frequencies.

While much of the discussion above has related to a traveling wave parametric device, this invention is not so limited, and discrete circuit parametric operation also is possible with the invention. For example, one embodiment of a discrete circuit optical parametric device is shown in FIG. 1. The embodiment of FIG. 1 may be operated in either the three- or four-frequency parametric operational mode, corresponding respectively to the equivalent circuits of FIGS. 1a and 1b.

In the traveling wave parametric device, it was important that the three- or four-frequencies involved in the parametric interaction exhibited frequencies and propagation constants which bore the relationships expressed by equations 6 and 8. However, for discrete circuit optical parametric interaction it is required that the cavity be simultaneously resonant at the frequencies of interest, which frequencies further must be related by equation 6.

In the embodiment shown in FIG. 1, the discrete circuit optical parametric device 60 includes an optical cavity comprising a p-n junction depletion layer waveguide 7 similar to that described herein above in conjunction with FIG. 9. As described earlier, the waveguide should comprise a dielectric material having nonlinear susceptibility, oriented so that the induced polarization is along a plane in which an input signal may be polarized. In a preferred embodiment, at each end of waveguide 7 there may be affixed thin film optical bandpass filters 65 and 67 of a type well known to those skilled in the art. Such bandpass filters each may comprise, e.g., one or more films of dielectric material having thicknesses and indices of refraction such that the filter at least partially will transmit light of certain frequencies and will reflect light at other frequencies.

Thin film dielectric filters 65 and 67 effectively provide internal reflection surfaces at either end of the depletion layer waveguide 7, thus permitting depletion layer 75 of parametric device 60 to function as a resonant optical cavity. Moreover, since the thickness of depletion layer 75 may be controlled by varying the bias voltage applied across electrodes 76 and 77, via conductors 78 and 79, the cavity may be tuned by appropriate selection of the bias voltage.

For a given bias voltage (i.e., depletion layer thickness) the dielectric optical cavity may be resonant simultaneously at a number of frequencies. Several techniques may be employed to achieve such simultaneous resonance in an optical tuned cavity of light at multiple frequencies. For example, filters 65 and 67 may be selected to produce different degrees of phase shift when reflecting light at different frequencies. Thus for a given cavity length (i.e., distance between filters 65 and 67) standing waves may occur simultaneously at various frequencies (and modes) for which the cavity length may not correspond to an integral number of wavelengths. Aternately, simultaneous resonance may be achieved without depending on variations in phase shift at the cavity ends by utilizing the dispersive characteristics of the dielectric waveguide. Thus frequencies and modes may be selected at which the phase velocity in the cavity of the various waves is identical; for a cavity of appropriate length, standing waves will occur at each of the selected frequencies.

Referring again to FIG. 1, a signal 94 may be focused onto one end of discrete circuit parametric device 60 using lens 95. In a preferred embodiment, filter 65 at the signal (input) end of parametric device may at least partially transmit light at the input frequency and may reflect light at all other frequencies. Pump 90 may be supplied by light source 91, which source preferably comprises a laser. The pump light 90 may be focused onto an end of parametric device 60 by lens 92 and dichroic mirror 93. As discussed previously, the signal and pump should be of the appropriate mode and polarization so as to insure that they will both resonate in the cavity, and further that the pump will induce a non-linear polarization in a plane corresponding to the polarization of the signal. Mode conversion, if required, may be achieved by using mode conversion filters disposed, e.g., on lenses 92 or 95.

Output 96 also may be obtained from one end of parametric device 60 via dichroic mirror 93 and lens 97. With the configuration illustrated in FIG. 1, the optical filter 67 preferably should be designed to pass light at both the pump frequency $\omega_p$ and the selected output frequency.

As with the traveling wave parametric device described herein above in conjunction with FIG. 10, parametric interaction between the pump and signal will create one or more idlers in discrete circuit parametric device 60. Three- or four-frequency operation may be achieved by appropriate selection of parameters, and output 96 may be obtained either at the signal input frequency or at one of the idler frequencies. Appropriate selection of the passband characteristics of output end filter 67 may permit discrimination, for example, between the signal frequency (e.g., at $\omega_1$) and a desired output at an idler frequency (e.g., at $\omega_3$).

Operation of either the traveling wave of discrete circuit optical parametric device in the four-frequency operational mode is desirable because it then may be possible to achieve frequency up-conversion with considerable gain. For example, an input signal in the infrared spectral region may be amplified and up-converted to provide an output in the visible portion of the spectrum. Such four-frequency up-conversion further is desirable because (as indicated by the operational mode spectrum of FIG. 2c) if an input frequency $\omega_1$ were selected in the infrared spectral region, the pump $\omega_p$ and idler $\omega_3$ (which may be selected as the output) both are considerably higher in frequency than the input signal and may both be in the visible spectral region.

To implement such four-frequency parametric up-conversion in the discrete circuit embodiment illustrated in FIG. 1, filter 67 may be conveniently selected, for example, to partially pass frequencies $\omega_p$ and $\omega_3$, while reflecting light at signal frequency $\omega_1$ and idler frequency $\omega_2$. At the same time, filter 65 may be selected to pass only wavelengths below frequency $\omega_x$ (where $\omega_1 ≳ \omega_x < \omega_2$); filter 65 thus will allow an input signal at $\omega_1$ to pass into the resonant cavity of parametric device 60 and will reflect signals at the idler frequency $\omega_2$, the pump frequency $\omega_p$, and the output frequency $\omega_3$.

While not specifically illustrated in the figures, it should be clear that techniques other than the use of thin film filters or dichroic mirrors may be used to separate the signal, idler, and pump waves. For example, the optical equivalent of a microwave circulator may be used for this purpose.

As an example of a practical application of the inventive optical parametric device, a four-frequency embodiment may be employed as an infrared to visible light converter capable of providing both frequency conversion and amplification of the input signal. A further advantage of such a parametric up-converter is that the phase of the input signal is maintained throughout the up-conversion and amplification. Thus, the output visible light would bear a direct phase relationship to the input signal; such a device then could be used as part of an imaging, infrared to visible up-converter.

An example of specific operating frequencies for a four-frequency infrared parametric up-converter is indicated by the following data:

TABLE III

| Port | Wavelength | Frequency |
|---|---|---|
| Signal Input ($\omega_1$) | 6.0 microns | $0.5 \times 10^{14}$ c/s |
| Lower Sideband Idler ($\omega_2$) | 1.43 microns | $2.1 \times 10^{14}$ c/s |
| Pump ($\omega_p$) | 1.15 microns | $2.6 \times 10^{14}$ c/s |
| Upper sideband Idler Output ($\omega_3$) | .97 microns | $3.1 \times 10^{14}$ c/s |

The four-frequencies listed in TABLE III bear the relationship required by equation 6 above. Moreover, the pump frequency corresponds to the strongest emission line of a neon-helium gas laser. Such neon-helium gas lasers may be operated reliably and continuously in the lowest order transverse mode, which mode contains a transverse electric field component which may be oriented to achieve pumping of the parametric device described herein. Furthermore, the output signal (at 0.97 microns) is compatible with the spectal response of commercial vidicons.

An alternate method of pumping the optical parametric device described hereinabove comprises forward biasing the *p-n* junction to cause carrier injection and thus produce recombination radiation at a frequency suitable for use as the pump. Further, application of a modulated waveform to the bias may be used to control the operation of the device. Also, the optical parametric device described hereinabove may be placed in a microwave cavity, and a microwave signal, present in the cavity, may be used as an input or output for the device at one of the parametrically related frequencies.

Although the invention has been described and illustrated in detail, it is to be clearly understood that the same is by way of illustration and example only, and is not to be taken by way of limitation, the spirit and scope of the invention being limited only by the terms of the appended claims.

I claim:

1. A device, comprising in combination:
a dielectric wavebinding structure comprising a solid dielectric support member, and a solid dielectric rectangular waveguide member of single crystal material attached to the support member, wherein the waveguide member exhibits an index of refraction larger than that of the support member and wherein the wavebinding structure is capable of simultaneously supporting a plurality of modes at parametrically related frequencies; and
means for introducing laser-type waves into said structure at said parametrically related frequencies, said structure exhibiting nonlinear susceptibility characteristics and effecting parametric interaction between said laser-type waves for propagation thereof at a substantially common phase velocity.

2. The device as stated in claim 1:
at least one of the laser-type waves introduced into said structure at the parametrically related frequencies being in opposite direction from any of the other of the laser-type waves introduced into said structure.

3. The device as stated in claim 1, wherein:
said wavebinding structure comprises cavity means, said cavity means providing simultaneous resonance of said parametrically related frequencies.

4. The device as stated in claim 1, wherein:
said wavebinding structure has a width approximately one-half wavelength of the highest of said parametrically related frequencies and a thickness no greater than the width.

5. The device as stated in claim 1, including:
antireflective means disposed as the ends of said wavebinding structure.

6. The device as stated in claim 5, wherein:
said antireflective means comprises means for introducing different amounts of phase shift for light which is reflected at different frequencies.

7. The device as stated in claim 1, wherein said wavebinding structure includes:
a pump source, having an optical pumping frequency of $\omega_p$ and an orientation appropriate for inducing nonlinear polarization in said dielectric waveguide; and
means for introducing pumping action and a signal into said waveguide in modes appropriate for propagation therein, said signal having at least one optical frequency selected from the frequencies $\omega_1$, $\omega_2$ and $\omega_3$, wherein $\omega_p = \omega_1 + \omega_2$, and $\omega_3 = \omega_p + \omega_1$.

8. The device as stated in claim 7, including:
means for separating light emerging from said device to obtain an output at one of the stated $\omega_1$, $\omega_2$, and $\omega_3$, and $\omega_p$ frequencies.

9. The device as stated in claim 7, wherein:
said pump source is a laser.

10. The device as stated in claim 7, wherein:
said means for introducing comprises a mode converter.

* * * * *